(12) United States Patent
Lai

(10) Patent No.: US 10,344,739 B2
(45) Date of Patent: Jul. 9, 2019

(54) METHOD OF DETERMINING AND CONTROLLING THE ATTACK ANGLE OF FIXED-SPEED WIND TURBINE BLADE

(71) Applicant: Ba At Lai, Hanoi (VN)

(72) Inventor: Ba At Lai, Hanoi (VN)

( * ) Notice: Subject to any disclaimer, the term of this patent is extended or adjusted under 35 U.S.C. 154(b) by 0 days.

(21) Appl. No.: 15/765,766

(22) PCT Filed: Apr. 5, 2016

(86) PCT No.: PCT/VN2016/000002
§ 371 (c)(1),
(2) Date: Apr. 4, 2018

(87) PCT Pub. No.: WO2017/063003
PCT Pub. Date: Apr. 13, 2017

(65) Prior Publication Data
US 2018/0291872 A1    Oct. 11, 2018

(30) Foreign Application Priority Data

Oct. 9, 2015  (VN) .............................. 1-2015-03779
Dec. 11, 2015 (VN) .............................. 1-2015-04745

(51) Int. Cl.
*F03D 7/02*    (2006.01)

(52) U.S. Cl.
CPC ......... *F03D 7/0224* (2013.01); *F03D 7/0276* (2013.01); *F03D 7/0284* (2013.01); *F05B 2240/312* (2013.01); *F05B 2260/70* (2013.01); *F05B 2270/101* (2013.01);
(Continued)

(58) Field of Classification Search
None
See application file for complete search history.

(56) References Cited

U.S. PATENT DOCUMENTS 8,772,955 B2 *  7/2014  Agtuca ................ F03D 1/0675
                                                    290/44
8,899,921 B2 * 12/2014  McCune .............. F03D 7/0236
                                                    416/1
2006/0056972 A1   3/2006  DeLong
(Continued)

FOREIGN PATENT DOCUMENTS

EP          2878811 A1    6/2015
WO    WO2008142498 A1    11/2008

*Primary Examiner* — Justin D Seabe
*Assistant Examiner* — Jason A Fountain
(74) *Attorney, Agent, or Firm* — Bacon & Thomas, PLLC

(57) ABSTRACT

A method of determining and controlling the attack angle of a fixed-speed wind turbine blade involves determination of an appropriate angle of attack for optimal extraction of wind energy at low to medium wind speed, which includes three steps: 1—defining basic parameters of the turbine including blade length and width, fixed rotational speed, rated wind speed, start-up speed and the lowest speed at which the turbine is forced to stop, and a relationship with wasted power; 2—defining wind speed based on a set of attack angles calculated to form an overall optimal attack angle of the wind turbine blade; and 3—calculating necessary physical parameters to come up with the most effective method of controlling the turbine blade so that the turbine can be directly connected to the grid, making wind power costs as low as those of other conventional energy sources.

1 Claim, 3 Drawing Sheets

(52) U.S. Cl.
CPC ... *F05B 2270/1033* (2013.01); *F05B 2270/32* (2013.01); *Y02E 10/721* (2013.01); *Y02E 10/723* (2013.01)

(56) References Cited

U.S. PATENT DOCUMENTS

2013/0028733 A1    1/2013  McCune
2015/0354534 A1*  12/2015  Pineda Amo ......... F03D 7/0224
                                              416/1

* cited by examiner

METHOD OF DETERMINING AND CONTROLLING THE ATTACK ANGLE OF FIXED-SPEED WIND TURBINE BLADE

FIELD OF THE INVENTION

The invention presents the manufacture of fixed-speed wind turbine blades for harnessing wind energy.

BACKGROUND OF THE INVENTION

Today the extraction of energy from wind is wholly based on variable speed wind turbines. Fixed-speed wind turbines have only come as far as testing phase and are not yet available for commercial use due to their limited output and the very high wind speed required to operate them. Moreover, as wind speed reduces to a low level, these turbines would consume so much energy from the grid that it could even lead to power grid shutdown.

The patents GB 191916385 dated Apr. 6, 1911 and GB 191028025 dated Aug. 3, 1911 as well as the patent US 2012242084 published on. Sep. 27, 2012 presented the manufacture of frame-supported wind turbine blades whose surface is a thin plate that can be furled or unfurled as well as the thin backside of the blade that allows for effective harnessing of wind energy. However, the patents did not point out how the angle of attack should be distributed along the blade length as well as how to adjust the angle of attack in response to wind speeds below the rated speed.

Given the fact that patent US 2012242084 did describe that each blade is rotated on its longitudinal axis 2 to 10 degrees, it also did not point out any rules for adjusting the attack angle. Employing these inventions in the manufacture of fixed-speed wind turbine blades therefore means the wind turbines falling short of economic and technological indicators since there is no way to control the turbine blade at wind speeds below the rated one. It would be problematic if, for example, the wind turbine is operating at a fixed speed and the angle of attack is not increasing when the wind speed drops below the rated one.

A misleading invention in the field of wind mechanics was in 1919 when Albert Betz published his equation for calculating the power of bladed wind turbine as: $P_{TB}=1/2 \rho A_0 v^3 C_p$ where $\rho$ is air density; $A_o$ is the swept area of the blade; v is wind speed and; $C_p$ is the power coefficient. The equation has led wind turbine technology in the direction of increasing the swept area $A_o$ of the blade (i.e. increasing the blade length), while overlooking other important physical factors of the blade such as the angle of attack, blade area and shape as well as the rotational speed of the wind turbine. Consequently, wind turbine blades have been broadly viewed as objects flying in the wind, which leads to the fact that turbine blades are all designed with an aerodynamic airfoil that supports movement of the blades. The author of this invention has come to realize that the equation was due to Albert Betz's application of Newton's second law in calculating the force of wind turbine acting on the wind: F=ma, where m is the mass of the wind and a is the acceleration of the wind. Actually, it is impossible to exert a force on an air mass, and more importantly, Newton's second law is of particle dynamics. Document related to this discovery has been publicly shared on Youtube at: https://Youtu.be/HTaAJQPkrp0 in both English and Vietnamese language.

Bladed wind turbines manufactured based on Betz' law have their blades with an aerodynamic airfoil. U.S. Pat. No. 4,339,230 dated Jul. 13, 1982 detailed a blade design that has both an airfoil-shaped upper surface and an airfoil-shaped lower surface, and again there are neither rules for the angle of attack nor indication of whether the blade width had to reduce towards the blade tip to avoid reduction in power. Moreover, as the rotational speed of the wind turbine depends on wind speed, it is impractical to produce a fixed-speed wind turbine whose energy generated can be fed directly to the grid.

These issues have put a limit on the output of wind turbines and resulted in very high costs of wind turbine manufacture and wind power generation, driving wind power away from becoming a major power source for human.

The correct standpoint would then be the view of wind turbine blade as an obstruction of the airflow, and the blade surface of a very short blade segment should be considered flat. Besides, a truss system should be employed to enhance the strength of the blade and minimize impacts on the wind. In fact, a wind turbine blade is subjected to two kinds of wind forces, one of which is caused by the collision of moving air particles with the blade surface and the other by the pressure drop on the backside of the blade. These forces are resolved into two components, one parallel to the turbine shaft which does not rotate the turbine but blows it down and the other tangential to the rotation orbit of blade segments which is useful, as it produces work to rotate the turbine. The author of this invention also invented a function for wind turbine power calculations, which is expressed as follows:

$$P_{TB}\left\{\left[\frac{1}{2}(Cx+j)a\rho \sum_{i=1}^{n} S_{Ci}d_i\omega_i(k_iv-d_i\omega_i\cot\alpha_i)^2\cos\alpha_i\sin^2\alpha_i\right]-P_O\right\}C_P$$

On the condition that: $0<\alpha_i<90°$ & $(k_iv-d_i\omega_i \cot \alpha_i)>0$

Where $P_{TB}$ (w) is the wind turbine power; $\rho$ is air density; $S_C$ is the area of blade segment i; v (m/s) is the velocity of the wind field; $\alpha_i(0°)$ is angle of inclination between the blade and the wind direction; $k_i$ is the attenuation coefficient of wind speed before the collision with blade segment i; $d_i$(m) is the distance from blade segment i to the turbine shaft; $\omega_i$(rad/s) is the turbine angular velocity; a is the number of turbine blades; j is the absorption coefficient of the blades; Cx is the dependent coefficient on the shape of the backside of the blade, which, if flat, will have the highest value of 1.32; $P_o$ is the loss in gearbox, generator and friction of the bearings; $C_p$ is the coefficient of power loss when transforming, which will be neglected if the generator is directly connected to the grid.

The invention has also been publicly shared on Youtube in both English and Vietnamese language at: https://Youtu.be/mWxlRlurAp0.

The function for wind turbine power calculations allows for relatively accurate calculations of the power of a wind turbine having blade surface in the form of a thin plate and blade segments short enough to be considered flat, based on factors such as wind speed, rotational speed of the turbine, blade area and the corresponding angle of attack at each position of the blade surface. As a result, it is feasible to design wind turbine blades with optimal technical features for the development of wind power generation.

The patent PCT/VN2015/000007 (Priority date: Jul. 14, 2014, Filling date: Jul. 10, 2015; International publication date: Jan. 21, 2016; WO patent number: 2016/011462) details the manufacture of wind turbine blades with truss-supported structure and twisted surface, which is in line with the viewpoint of a wind turbine blade as an obstruction of the airflow in the process of harnessing wind energy. The wind turbine blade design in patent PCT/VN2015/000007 employs the function for wind turbine power calculations to determine the optimal angle of attack at each position of the blade surface along the blade length corresponding to the rated wind speed and the highest rotational speed of the wind turbine. A set of these attack angles is used to define the overall optimal angle of attack for the turbine blade, which is the angle at the rated wind speed.

The determination of the rated wind speed in patent PCT/VN2015/000007 for defining the angle of attack for the turbine blade is only applicable to variable speed wind turbines. As the wind speed gradually reduces, so will the rotational speed of the turbine, and the appropriate attack angle of the blades will allow the turbine to achieve an output that is comparable to its maximum output thanks to the attack angle determined at that wind speed. For fixed-speed wind turbine, the lower the wind speed, the smaller the turbine output compared to its maximum output thanks to the attack angle determined at that wind speed. Therefore, start-up speed and the lowest speed at which the turbine is forced to stop would be relatively high, and the turbine output at medium and low wind speeds would reduce to a large extent. Based on calculations at the lowest speed at which the turbine is forced to stop, wind turbine output is between 30-40% of the maximum output thanks to the attack angle determined at that wind speed. When the wind speed is just below the rated value, the reduction in the turbine output is negligible. More importantly, since the wind turbine output at that point is already very high, even a further reduction presents no significant impact on the output of the grid.

The control of the attack angle of fixed-speed wind turbine blades in patent PCT/VN2015/000007, however, has not been clear and specific enough. That the attack angle at the blade tip is adjusted to approximately 89° would not be satisfactory in cases of low speed at the blade tip. Besides, the determination of basic parameters for fixed-speed wind turbines has not been detailed to facilitate the design process.

SUMMARY OF THE INVENTION

The invention named Method of determining and controlling the attack angle of fixed-speed wind turbine blade, which is applied for a wind turbine blade having a thin plate as its surface and composed of blade segments short enough to be considered flat, aims at establishing an appropriate attack angle of wind turbine blades for effectively harnessing wind energy at low and medium wind speed, if the range of speed from the lowest speed at which the turbine is forced to stop to, the rated speed is divided into low, medium and high. The designed attack angle of turbine blade is fixed; however, there is always the best attack angle for each specific wind speed, at which the turbine achieves its maximum output. Since it is impossible to change or adjust the attack angle to achieve the maximum output at any wind speed, it is therefore necessary to control the attack angle to produce an optimal output at low and medium wind speeds. Once the blade is designed with an angle of attack that corresponds to wind speeds from low to medium, its attack angle will not be too different from the optimal angle, resulting in an output that is only slightly lower than the maximum output. This would allow for the manufacture of fixed-speed wind turbines that achieve an optimal output at low and medium wind speeds while being able to stop and restart at low wind speeds. Even though the turbine output at high wind speeds falls significantly from the maximum output, the output at such a point is still very high thus presenting no remarkable impact on the power grid.

To achieve the above aims, the invention "Method of determining and controlling the attack angle of fixed-speed wind turbine blade" details three steps in making a blade with an optimal angle of attack for best extraction of wind energy at low and medium wind speeds.

The first step is defining basic parameters of the wind turbine, including the blade length, blade width, the fixed speed of turbine, the rated wind speed, the start-up speed and the lowest speed at which the turbine is forced to stop as well as the relationship with the wasted power.

The second step is choosing a wind speed for determining the attack angle, based on which a set of attack angles can be calculated to form an overall optimal attack angle of the blade.

The third step is controlling the blades, which is adjusting the angle of attack in response to wind speeds between low to medium range.

The appropriate attack angle of the blade and a method of controlling the attack angle in response to different wind speeds help the wind turbine achive an optimal output at low and medium wind speeds. As a result, it is possible to produce fixed-speed wind turbines at low costs for wind energy production as well as to transform variable speed wind turbines into fixed-speed ones for better performance, higher output, and lower wind power costs.

DETAILED DESCRIPTION OF THE INVENTION

Figure 1:
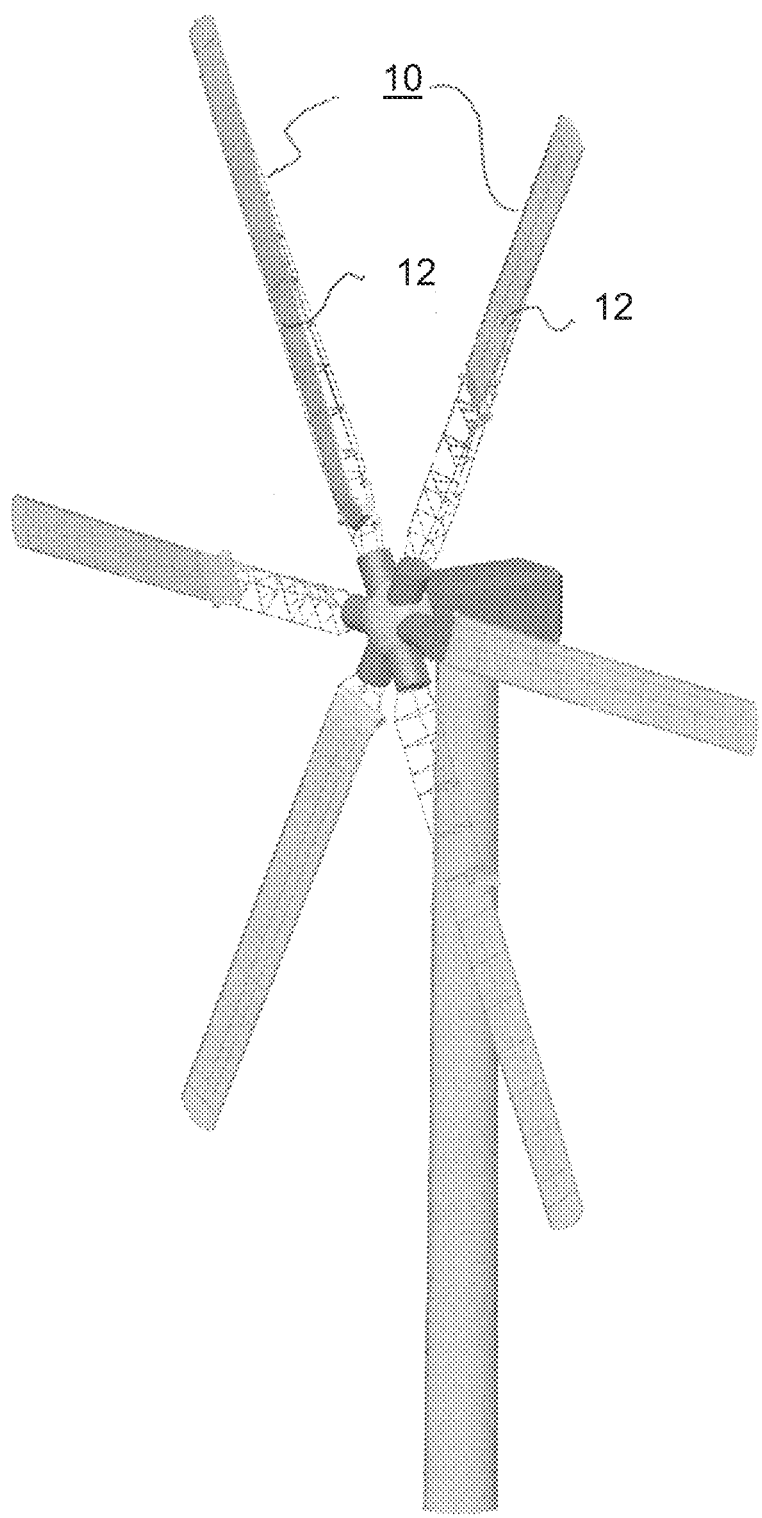
FIG. 1 shows an overall view of a fixed speed wind turbine with six truss-supported and twisted blades, three of which are shorter than the others. The blades have retractable surface and are about 15 meters above the ground from the blade tip.

The method of determining and controlling the attack angle of fixed-speed wind turbine blade, which is applied for a wind turbine blade having a thin plate as its surface and composed of blade segments short enough to be considered flat, aims at establishing an appropriate attack angle of wind turbine blades for effectively harnessing wind energy at low and medium wind speed, if the range of speed from the lowest speed at which the turbine is forced to stop to the rated speed is divided into low, medium and high. This would allow for the manufacture of fixed-speed wind turbines that achieve an optimal output at low and medium wind speeds while being able to stop and restart at low wind speeds. The invention details three steps as follows:

The first step is to define basic parameters of the turbine, including the choice of linear speed at the blade tip between 100 and 200 km/h. Such a high linear speed aims at noise reduction and better control of the blade attack angle. A linear speed of up to 300 km/h maybe possible; however, the noise generated by the turbine could then be critical, even at low wind speeds, and the control of the blade attack angle would be ineffective. A fixed speed of the turbine should also be defined, based on which and the linear speed at the blade tip, the blade length would be calculated. Otherwise, a blade length should be chosen so that the fixed speed of the turbine could be calculated based on it and the linear speed at the blade tip. In this case, the fixed rotational speed is inversely proportional to the blade length. The blade width should be less than 10% of the blade length and should not exceed 6 m so as to minimize the attenuation of wind speed before colliding with the blade surface. Blades of less than 6 m wide would facilitate the manufacture and installation of the wind turbine, since they can go nicely with metal sheets used for making commercial rolling doors. Define the lowest speed at which the turbine is forced to stop as one at which the turbine produces an output that is 20% higher than the wasted power, i.e. the amount of energy consumed due to friction of the gear box, the generator and drag as the blades rotate. This is to make sure the turbine would not consume energy from the grid before it is forced to stop. The start-up speed should be defined as one at which the turbine output is three to four times higher than the wasted power. This means the start-up speed and the lowest speed at which the turbine is forced to stop are only 1-1.5 m/s apart, thus preventing the wind turbine from having to restart too often at wind speeds slightly below the start-up speed. The rated speed should be defined as the minimum wind speed at which the turbine reaches its maximum or rated output. The conventional rated wind speed is about 16 m/s, because in regions where winds are strong, wind speeds are usually between the $5^{th}$ and $6^{th}$ scale on Beaufort scale, i.e. from 8 to 13.8 m/s measured at 10 m above ground. That means at 40 m above ground wind speeds would range from 11 to 18 m/s, which ensures frequently high outputs of wind turbines.

Figure 2:
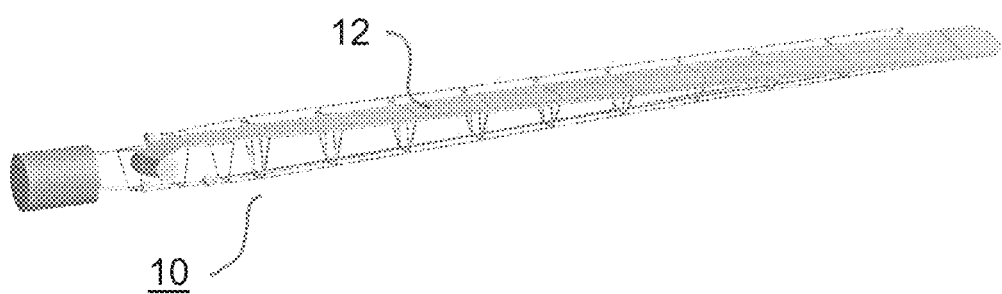
FIG. 2 shows one of the wind turbine blades illustrated in FIG. 1
Figure 3:
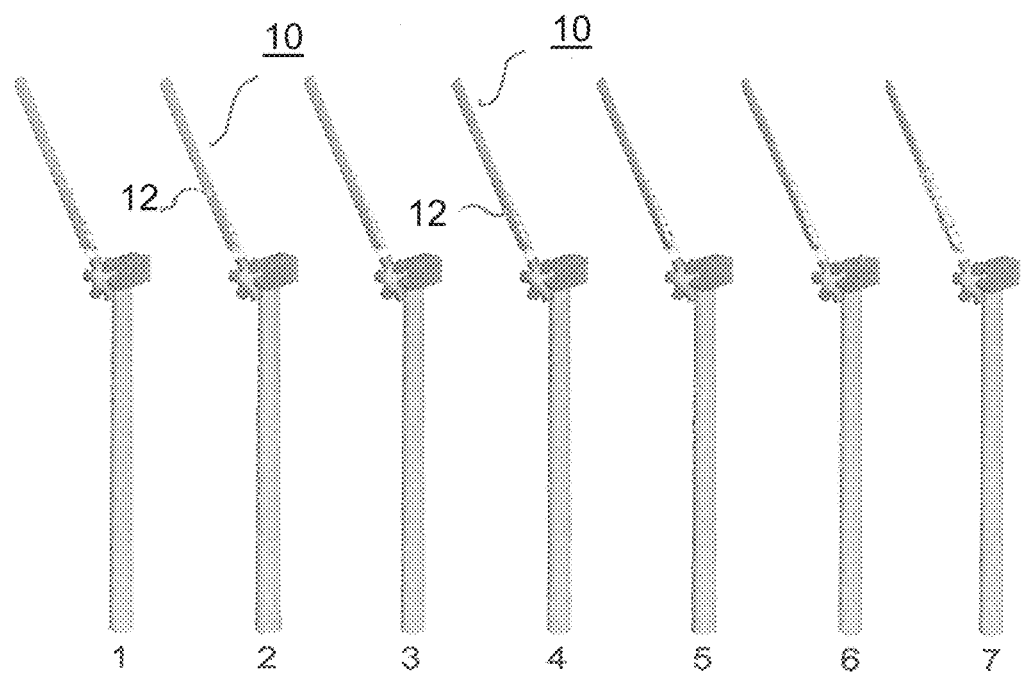
FIG. 3 shows the manner in which the attack angles of the blade of FIG. 2 are changed according to the method of the invention.

The second step is to define wind speed v to determine the attack angle of the blades. This wind speed should range from low to medium, based on which the function for wind turbine power calculations could be applied to compute a set of attack angles $\alpha_i$ for maximum power of the blade at each position i along the blade, at a distance $d_i$ from the center of rotation and at the fixed rotational speed $\omega_i$ of the turbine. Such a set of angles $\alpha_i$ is used to tilt a wing surface formed by a thin plate 12 of one of the turbine blades 10, as illustrated in FIGS. 1 and 2, to increase or decrease a current blade attack angle $\alpha$. FIG. 3 shows how the surface of thin plate 12 tilts as the angle of attack of one of the blades 10 is varied from position 1 to position 7. The attack angle at the blade tip is called $\alpha_c$. The wind speed for determining the blade attack angle, if chosen randomly, can negatively influence the control of the blades and reduce the energy output.

The third step is to control the blades. Specifically, as the wind speed reduces by one unit, from the wind speed for determining the blade attack angle $v_c$=a m/s (km/h mph) to the speed at which the turbine is forced to stop, the angle of attack increases by a value of $$\frac{90°00' - \alpha_c}{a}.$$

As the wind speed increases by one unit, from the speed at which the turbine is forced to stop to the rated one, the angle of attack drops by a value of $$\frac{90°00' - \alpha_c}{a}.$$

As the wind speed falls by one unit, from the rated speed to the speed $v_c$, the angle of attack increases by a value of $$\frac{90°00' - \alpha_c}{a}.$$

Prepare a table illustrating wind turbine power at different wind speeds in order to determine the speed at which the turbine is forced to stop and the start-up speed in relation to the wasted power. The rated output at the rated wind speed can also be determined.

Once the above controlling method is employed and the wind speed for determining the blade attack angle $v_c$ is between low and medium range, the deviation between the attack angle of the blades at such wind speed and the optimal angle of attack for maximum output is negligible. Calculations applied to a wind turbine having blade length of 66 m and a rotational speed of 6 rpm show that the deviation between the blade attack angle and the optimal angle at the blade root is approximately 1°. However, at the blade tip the deviation between the attack angle and the optimal one is negligible, i.e. only several minutes. Therefore, the turbine output only slightly reduces compared to its maximum value. This can be easily examined using the turbine power curve. Though the turbine output at high wind speeds drops remarkably, this is not a problem, since the output of the whole system is already high, and indeed, this plays an active role in reducing the peak power of the grid.

When the wind speed is lower than the lowest speed at which the turbine is forced to stop, the generator is disconnected from the grid to prevent the turbine from consuming energy of the grid. The blade attack angle is then reduced in a way that the attack angle in the middle of the blade is down to 0° at which the turbine would slow down then come to a stop thanks to the braking system. The turbine restarts as soon as the wind speed equals or exceeds the start-up speed. At this point, the attack angle is again adjusted so that the attack angle in the middle of the blade reaches 55°, allowing the blade to get the maximum torque. The braking system is now disengaged and the turbine blades rotate at higher and higher speeds with gradually increasing angle of attack. As soon as the rotational speed equals the fixed speed, the generator is re-connected to the grid and the angle of attack is adjusted to its designed value corresponding to the wind speed at this point.

When the wind speed exceeds the rated one, the angle of attack is reduced to an extent just enough to stabilize the turbine output at the rated value. At wind speed of about 25 m/s the turbine stops working; the angle of attack drops to 0°, or the blade surface would be furled up if the wind turbine is constructed with this feature. The generator is also disconnected from the grid, and the braking system kicks in to keep the turbine still. The wind turbine can either be operated automatically by sensors or manually.

Wind speeds are high and stable at heights of 40 m and above but reduce at heights below 40 m. However, from over 10 m above ground wind speeds do not reduce remarkably, thus wind turbine blades that are 10 m above the ground are satisfactory in airy areas.

Wind turbines can be made with multiple blades (FIG. 1) to increase contact area with the wind, and for wind turbines having blades of over 40 m long, the number is not limited to three blades. However, the blades should be far apart enough to ensure minimum attenuation of the wind speed. As a result, the blade root should be made without a surface, and that on alternate blades should comprise an even larger area without a surface to accommodate this requirement.

INDUSTRIAL APPLICABILITY

The method of determining and controlling the attack angle of fixed-speed wind turbine blade, which is applied for a wind turbine blade 1 having a thin plate 2 as its wing surface and composed of blade segments short enough to be considered flat, is used in the manufacture and operation of fixed speed wind turbines. The turbine blades 10 are truss-supported and are made of a thin plate 12 that can be furled up, as shown in FIG. 1, to protect the turbine in strong winds. This allows for an increase in blade area by increasing the blade length and width as well as the number of blades. For wind turbines with blade length of over 40 m, six blades would be appropriate. Fixed-speed wind turbines directly connected to the power grid have the advantages of higher output, low-cost generator, no inverter needed and allow the blades to be made of relatively heavy metal and manufactured separately, which facilitate transportation in containers. The costs of wind power would therefore be greatly reduced, and wind energy would become the cheapest source of energy for many countries, meeting the demand for both economic development and the fight against climate change.

The method of determining and controlling the attack angle of fixed-speed wind turbine blade is also applicable to the transformation of variable speed wind turbines into fixed-speed ones. Such transformation is made possible by preserving the height of the tower, expanding the blade width, extending the blade length by 1.5 times, eliminating the use of an inverter, replacing the generator by a fixed speed one, and directly connecting the turbine to the grid. The most fundamental issue is whether the gearbox is compatible or not. If replacement of the gearbox is compulsory, the transformation is still beneficial because with the increased number of blades to 6 and greater turbine output, the wind turbine can produce an output that is comparable to that of a new fixed-speed wind turbine.

Demonstration

Define the basic physical parameters for a fixed speed wind turbine with truss-supported blades whose surface is a thin plate that can be furled or unfurled as follows:

Predetermined Basic Parameters

Tower: 80 m high, 6-8 m in diameter.
Anticipated wasted power: 6.5 kW
Linear speed at the blade tip: 150 km/h
Blade: 5 m wide and 66 m long
Fixed rotational speed: 6 rpm Three of the turbine blades are made with a surface of 60 m long from the blade tip.

The other three blades are made with a surface of 46 m long from the blade tip.

The blade surface can be furled and unfurled, as illustrated in FIG. 1.

Rated wind speed: 16 m/s

Cut-out speed at which the turbine stops working and the blade surface is furled up: 25 m/s Choose the following parameters: k=1; j=1; Cx=1.32 when applying the function for wind turbine power calculations.

A set of attack angles at different positions on the blade determined at wind speed of 8 m/s is presented as follows:

| Distance to turbine shaft d (m) | Inclination angle α |
|---|---|
| 5 | 65°28' |
| 7 | 68°54' |
| 9 | 71°25' |
| 11 | 73°37' |
| 13 | 75°25' |
| 15 | 76°55' |
| 17 | 78°9' |
| 19 | 79°12' |
| 21 | 80°5' |
| 23 | 80°51' |
| 25 | 81°30' |
| 27 | 82°4' |
| 29 | 82°35' |
| 31 | 83°2' |
| 33 | 83°25' |
| 35 | 83°47' |
| 37 | 84°6' |
| 39 | 84°23' |
| 41 | 84°39' |
| 43 | 84°53' |
| 45 | 85°6' |
| 47 | 85°18' |
| 49 | 85°30' |
| 51 | 85°40' |
| 53 | 85°50' |
| 55 | 85°58' |
| 57 | 86°7' |
| 59 | 86°14' |
| 61 | 86°22' |
| 63 | 86°28' |
| 65 | 86°35' |

Parameters for Calculation:

Maximum angle of attack at the blade tip: $\alpha_d$=88°48'.

As the wind speed reduces by 1 m/s, this angle of attack increases by 26'.

As the wind speed increases by 1 m/s, this angle of attack decreases by 26'.

The angle of attack will continue to decrease as the wind speed exceeds the rated one so that the wind turbine output stabilizes at the rated level.

Start-up speed: 4 m/s

Lowest wind speed at which wind turbine is forced to stop: 3 m/s

Wind turbine power at rated wind speed: P16=1254 KW.

Generator capacity: 1.500 KW

The following table shows wind turbine power at different wind speeds:

| Wind velocity v (m/s) | Power P (kW) |
|---|---|
| 2.8 | 6.1 |
| 3 | 7.9 |
| 4 | 21 |
| 5 | 42 |
| 6 | 75 |
| 7 | 117 |
| 8 | 174 |
| 9 | 244 |
| 10 | 330 |
| 11 | 467 |
| 12 | 555 |
| 13 | 698 |
| 14 | 860 |
| 15 | 1046 |
| 16 | 1245 |

Starting torque at start-up speed of 4 m/s and with an angle of attack in the middle of the blade of 55°: 547 KNm Maximum axial thrust at rated wind speed of 16 m/s: 323 KN.

The invention claimed is:

1. A method of determining and controlling an attack angle of a fixed-speed wind turbine blade of a wind turbine in order to establish an appropriate attack angle of the wind turbine blade for effectively harnessing wind energy at low and medium wind speeds and enable stop and restart in low winds, wherein the fixed-speed wind turbine blade having a thin plate as its surface and composed of substantially flat blade segments, and wherein a range of speeds from a lowest speed at which the wind turbine is forced to stop to a rated speed is divided into low, medium and high wind speeds; comprising the steps of:

first, defining basic parameters of the wind turbine by:
- (a) choosing a linear speed at a tip of the fixed-speed wind turbine blade of between 100-200 km/h; and
  - (a1) choosing a fixed rotational speed that enables a length of the fixed-speed wind turbine blade to be defined based on the chosen fixed rotational speed and the chosen linear speed; or
  - (a2) choosing a length of the fixed-speed wind turbine blade that enables a fixed speed to be calculated based on the chosen linear speed and chosen length of the fixed-speed wind turbine blade,
  wherein a width of the fixed-speed wind turbine blade is smaller than 10% of the length of the fixed-speed wind turbine blade and no more than 6 m,
- (b) defining a lowest wind speed at which wind turbine is forced to stop as the wind speed at which the turbine output is 20% higher than wasted power;
- (c) defining a start-up speed as the wind speed at which the turbine output is 3-4 times higher than the wasted power;
- (d) defining the rated wind speed as one at which the turbine reaches its maximum or rated output; and
- (e) defining a cut-out speed as a highest speed at which the turbine is forced to stop;

second, defining a wind speed $v_c$ which ranges from low to medium to be used with a function for wind turbine power calculations to compute a set of attack angles $\alpha_i$ for maximum power of the wind turbine blade at each position i along the blade, at a distance $d_i$ from a center of rotation, and at a fixed rotational speed $\omega_i$ of the wind turbine; and using the set of angles of attack $\alpha_i$ to tilt a wing surface of the wind turbine blade so that a tip of the wind turbine blade is oriented at an attack angle $\alpha_c$;

third, controlling the wind turbine by further tilting the wing surface to increase or decrease a current blade attack angle $\alpha$ according to the following steps:

as the wind speed decreases from the wind speed $v_c$ for determining the current blade attack angle $\alpha$ ($v_c$=a m/s (km/h or mph)) to the lowest speed at which the wind turbine is forced to stop, increasing the angle of attack by a value of $$\frac{90°00' - \alpha_c}{a}$$

as the wind speed increases from the speed at which the turbine is forced to stop to the rated wind speed, decreasing the angle of attack by a value of $$\frac{90°00' - \alpha_c}{a};$$

and as the wind speed decreases from the rated wind speed to the wind speed $v_c$, increasing the angle of attack by a value of $$\frac{90°00' - \alpha_c}{a}.$$

* * * * *